United States Patent
Tai et al.

(10) Patent No.: US 11,664,967 B2
(45) Date of Patent: May 30, 2023

(54) NETWORK DEVICE

(71) Applicant: ACCTON TECHNOLOGY CORPORATION, Hsinchu (TW)

(72) Inventors: Bang-Jun Tai, Miaoli County (TW); Yu-Yun Lee, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 45 days.

(21) Appl. No.: 17/444,909

(22) Filed: Aug. 11, 2021

(65) Prior Publication Data

US 2022/0060311 A1    Feb. 24, 2022

(30) Foreign Application Priority Data

Aug. 19, 2020  (TW) .................. 109128262

(51) Int. Cl.
*H04L 7/00* (2006.01)
*H04J 3/06* (2006.01)

(52) U.S. Cl.
CPC .......... *H04L 7/0033* (2013.01); *H04J 3/0667* (2013.01); *H04J 3/0697* (2013.01); *H04L 7/0091* (2013.01)

(58) Field of Classification Search
CPC .............................. H04J 3/0667; H04J 3/0697
See application file for complete search history.

(56) References Cited

U.S. PATENT DOCUMENTS

| | | | |
|---|---|---|---|
| 10,084,559 B1* | 9/2018 | Devineni | H04J 3/0661 |
| 2011/0013737 A1* | 1/2011 | Lee | G04C 11/04 375/356 |
| 2013/0002321 A1* | 1/2013 | Cho | H03L 7/00 327/158 |
| 2013/0215910 A1* | 8/2013 | Inomata | H04J 3/0667 370/503 |
| 2019/0379475 A1* | 12/2019 | Seethamraju | H04J 3/0688 |
| 2020/0127752 A1* | 4/2020 | Tai | H04J 3/0667 |
| 2020/0328872 A1* | 10/2020 | Shi | H04J 3/0685 |
| 2021/0288736 A1* | 9/2021 | Guignard | H04J 3/0667 |
| 2021/0385058 A1* | 12/2021 | Guignard | H04J 3/0644 |

* cited by examiner

*Primary Examiner* — Gary Mui
(74) *Attorney, Agent, or Firm* — CKC & Partners Co., LLC (57) ABSTRACT

A network device adapted for sending a synchronization packet to a slave device. The synchronization packet includes a timestamp field and a correction field. The network device includes a counting circuit, a communication chip, and a processor. The counting circuit is configured to provide a calendar time TOD. The communication chip includes a first port, a second port, and a timestamp circuit which has a bit number N. The processor is coupled to the first port of the communication chip. The processor is configured to: obtain a remainder R according to the calendar time TOD and the bit number N; and write the calendar time TOD and the remainder R into the synchronization packet.

15 Claims, 5 Drawing Sheets

---

Reading the calendar time TOD of the counting circuit — S310

Obtaining the remainder R by computing the calendar time TOD and the bit number N of the timestamp circuit — S315

Generating the synchronization packet according to the calendar time TOD and the remainder R — S320

The communication chip does not modify the correction field CF when receiving the synchronization packet and modifies the correction field of the synchronization packet according to a sending time Te of the synchronization packet when sending the packet — S330

NETWORK DEVICE

CROSS-REFERENCE TO RELATED APPLICATION

This application claims priority to and the benefit of Taiwan Application Serial Number 109128262, filed on Aug. 19, 2020, the entire content of which is incorporated herein by reference as if fully set forth below in its entirety and for all applicable purposes.

BACKGROUND

Field of Disclosure

The disclosure generally relates to network devices, and more particularly, to network devices for providing time synchronization.

Description of Related Art

The Network Time Protocol (NTP) is a time synchronization standard for network devices. Because the precision of the electric element increases, a high precision time synchronization standard is developed accordingly. Therefore, the IEEE 1588 Precision Time Protocol (PTP) is made. For example, there are many network devices deployed in a communication environment includes master devices and slave devices. The network device which is adapted as master device provides a time information carried in a packet to another network device adapted as slave device, such that the slave device uses the time information to calibrate the local time and to sync with the clock of the master device.

Generally, the network chip of the network device has a built-in counter, and the value range of the counting number of the counter is determined by the bit number of the counter. For example, if the counter has 32 bits, the counter will overflow after counting the value 4294967296 (i.e., $2^{32}$) and restarting counting from 0. In other words, when the unit is 1 nanosecond, the counter can provide the range of counting value from 0 to 4.294967295 seconds. Since the counter will be restarted and then counted from 0 in response to the counting value exceeding the range, it is unable to provide a sufficient information about entire calendar time TOD (Time of Day) based on the counting value.

On the other hand, the network device, such as the network switch, receives and sends the packet through the network chip, such as the Media Access Control Chip (MAC) Chip. The value generated by timestamp counter of the MAC Chip is required for recording the time when the packet is received and sent through the MAC chip. Because the bit number of the timestamp counter of the MAC Chip is limited that it cannot provide enough value to represent a calendar time, such that the network switch which such MAC Chip is built-in cannot be adapted as the master device based on the precision time protocol.

Furthermore, if the network switch is planned to be the master device and executes the 1-step synchronization mode, the circuit of physical layer in the network switch requires a high performance in writing the sending time into the packet. The hardware cost of the network switch is increased.

Figure 1:
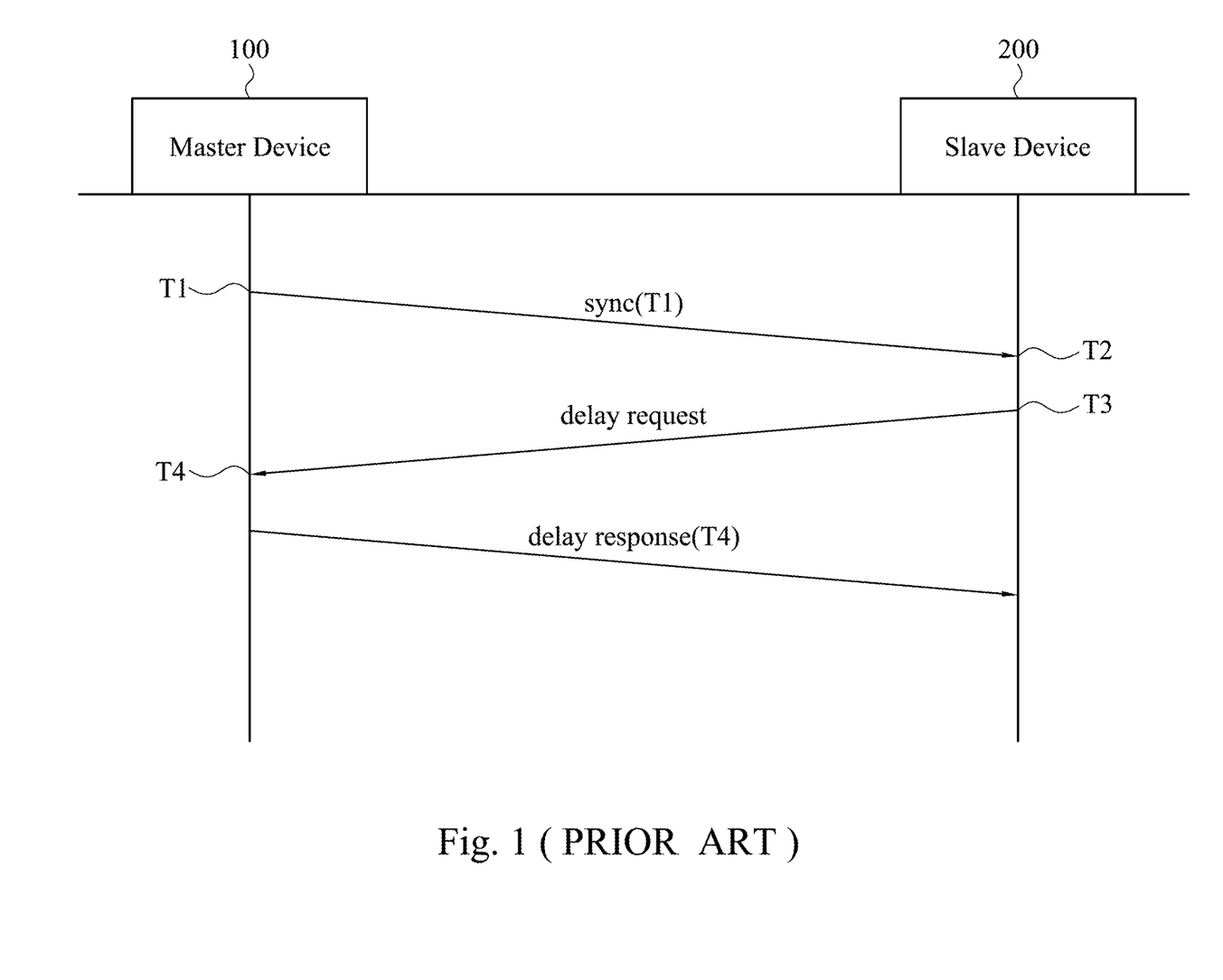
FIG. 1 is a diagram illustrating that the master device and the slave device operate in the 1-step synchronization mode.

Based on the 1-step synchronization mode of IEEE1588 protocol, the master device sends the time T1 to the slave device only by the synchronization packet without the follow-up packet. Reference is made to FIG. 1. FIG. 1 is a diagram illustrating that the master device 100 and the slave device 200 operate in the 1-step synchronization mode. As shown in FIG. 1, the master device 100 sends the synchronization packet (sync) which carries the time T1 to the slave device 200, and the time T1 is the sending time that the master device 100 sends the synchronization information. After the slave device 200 receives the synchronization information in the time T2, the slave device 200 sends the delay request packet (Delay Request) to the master device 100 at the time T3. The master device 100 receives the delay request packet at the time T4. For responding to receiving the delay request packet, the master device 100 will send the delay response packet (Delay response) which carries the time information (T4) to the slave device 200. Based on all of these 4 time information, the slave device 200 can compute the delay time and update the local time clock accordingly. The 1-step synchronization mode can be used to enhance the efficiency of updating the time. However, the 1-step synchronization needs a specific hardware architecture.

Accordingly, it is an issue how the network switch provides the 1-step synchronization mode without increasing chip cost is to be solved.

SUMMARY

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

One aspect of the present disclosure is to provide a network device adapted for sending a synchronization packet to a slave device. The synchronization packet includes a timestamp field and a correction field. The network device includes a counting circuit, a communication chip, and a processor. The counting circuit is configured to provide a calendar time TOD. The communication chip includes a first port, a second port, and a timestamp circuit which has a bit number N. The processor is coupled to the first port of the communication chip. The processor is configured to: obtain a remainder R according to the calendar time TOD and the bit number N; and write the calendar time TOD and the remainder R into the synchronization packet.

One aspect of the present disclosure is to provide a network device adapted for sending a synchronization packet to a slave device, and the network device obtains a first calendar time TOD1, a first remainder R1, and a first chip receiving time Ti1 in a period when a first synchronization packet is generated. The synchronization packet includes a timestamp field and a correction field. The network device includes a counting circuit, a communication chip, and processor. The counting circuit is configured to provide the first calendar time TOD1 in a period when the first synchronization packet is generated and provide a second calendar time TOD2 in a period when a second synchronization packet is generated. The communication chip includes a first port, a second port, and a timestamp circuit which has a bit number N, which the first port and the second port are set as a transparent mode, and the first chip receiving time Ti1 is obtained when the first synchronization packet is received and a second chip receiving time Ti2 is obtained when the second synchronization packet is received. The processor is coupled to the first port of the communication chip, and the processor is configured to: write the second calendar time TOD2, the first remainder R1, and the first chip receiving time Ti1 into the second synchronization packet.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

DETAILED DESCRIPTION

The technical terms "first", "second" and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Reference will now be made in detail to the present embodiments of the disclosure, examples of which are illustrated in the accompanying drawings. Wherever possible, the same reference numbers are used in the drawings and the description to refer to the same or like parts.

The network communication device in the disclosure includes Layer 2 devices (e.g., switches), Layer 3 devices (e.g., routers), mixture type network devices which have L2/L3 configurations, and so on. The devices and methods in the disclosure are not limited to which original equipment manufacturer or which stack of the open system interconnection model (OSI). All the network devices, programs, and virtual machines supporting functions of low layers of the OSI model (e.g., Layer 1 to Layer 4) fall into the scope of the disclosure. For the sake of brevity, the term "network device" is used in the disclosure.

Figure 2:
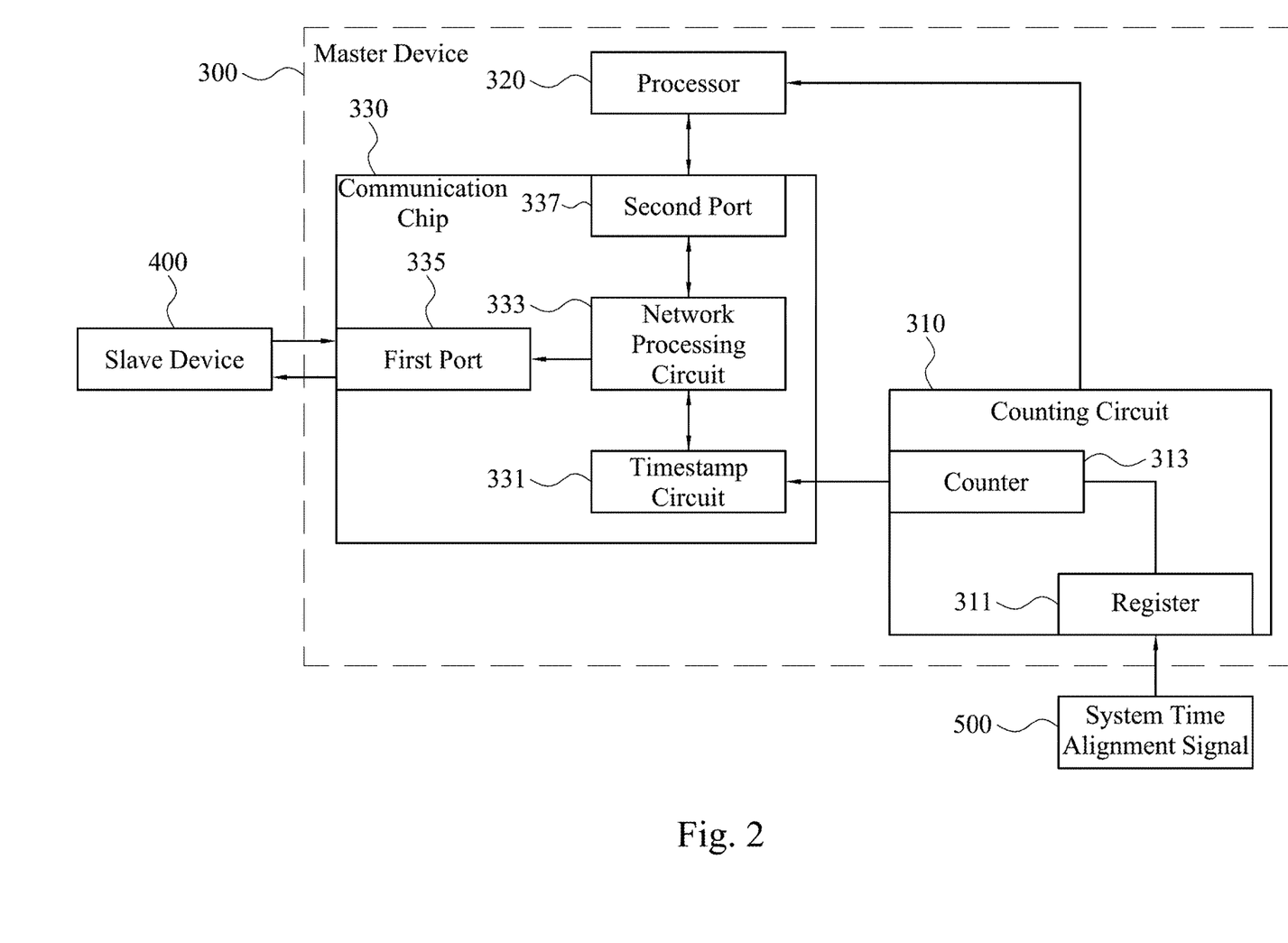
FIG. 2 is a block diagram of a master device according to some embodiments of the present disclosure.

Reference is made to FIG. 2. FIG. 2 is a block diagram of a master device 300 according to present embodiments of the present disclosure. In present embodiments, the master device 300 receives a system time alignment signal 500 to calibrate a calendar time TOD (Time of Day) of the counting circuit 310. The master device 300 sends a synchronization packet which carries time information corresponding to the calendar time TOD, and a slave device 400 updates its clock by the time information to perform time synchronization with the master device 300.

As shown in FIG. 2, the master device 300 includes a counting circuit 310, a processor 320, and a communication chip 330. The counting circuit 310 is coupled to the processor 320 and the communication chip 330. The counting circuit 310 is configured to provide the calendar time TOD. In addition, the counting circuit 310 updates its counting-time value and its counting frequency in according to the standard time obtained from the calendar time and 1 pulse per second (1 PPS) signal provided by a time providing device (not shown). The time providing device is, for example, a Global Positioning System (GPS) or a device which provides standard calendar time and pluses. The standard time is, for example, Coordinated Universal Time (UTC).

In present embodiment, the counting circuit 310 further includes a register 311 and a counter 313. The register 311 stores signals provided from the time providing device. The counter 313 performs the counting procedure and provides the calendar time and calibrates the calendar time and the counting frequency according to the signals stored in the register 311. In some embodiments, the counter 313 is with 80-bit length and provides the counting value from 0 to $2^{80}-1$ for representing the calendar time TOD. In some embodiments, the counting circuit 310 can be, but is not limited to, the Field Programmable Gate Array (FPGA).

The communication chip 330 includes a timestamp circuit 331, a network processing circuit 333, a first port 335, and a second port 337. The timestamp circuit 331 provides a counting value. In the embodiment, the timestamp circuit 331 is with N-bit length and counts circularly among 0 to $2^N-1$. In the embodiment, N is 32, and the timestamp circuit 331 counts from 0 to 4294967295. The timestamp circuit 331 restarts counting from 0 again after the counter overflow. That is to say, when the unit of the counting value is 1 ns, the timestamp circuit 331 counts circularly among 0 to 4.294967295 seconds. It should be noted that the larger the bit number of the timestamp circuit 331 is the more time information can be carried, but the circuit cost will increase accordingly.

In some embodiments, the first ports 335 and second 337 are interfaces for receiving and sending packets. The network processing circuit 333 forwards a packet to a determined port and determines whether to compute receiving/sending time with some specific fields of the packet in according to the mode of the receiving/sending port that is a transparent mode or a normal mode. In the embodiment, when the port is set as the transparent mode, the value encapsulated in specific field of the packet will be subtracted from the time the packet is received by the port. On the other hand, the value encapsulated in specific field of the packet will be added to the time the packet is sent out from the port. In the embodiment, the specific field of the packet is a correction field.

In some embodiments, the communication chip 330 is a media access control (MAC) chip or a Layer2/Layer3 network chip.

According to 1-step synchronization mode in complying with IEEE 1588 precision time protocol, synchronization packet that the master device 300 sends to the slave device 400 carries a sending time T1. The slave device 400 receives the synchronization packet at time T2 and obtains the sending time T1 by analyzing the synchronization packet.

Subsequently, the slave device 400 sends a delay request packet at time T3. The master device 300 records a receiving time T4 when the delay request packet received and sends the receiving time T4 to the slave device 400 through the delay response packet. Accordingly, the slave device 400 can compute and compensate the time deviation by using the time T1 to T4 and the time synchronization process is then performed.

Generally, if the master device executes the time synchronization process in following 1-step synchronization mode, the physical-layer hardware has to send the synchronization packet and write the sending time T1 into a timestamp field (Timestamp) of the synchronization packet at the same time. In this case, if the network device to be as master device is able to perform 1-step synchronization mode, not only the circuit of the physical layer but also the MAC chip which has a built-in physical layer circuit needs higher performance of hardware architecture. Therefore, the cost will be increased.

The following embodiment will describe that the network device is adapted for the master device and how the master device which has the communication chip of the limited-bit-number timestamp circuit 331 generates and sends the synchronization packet to perform 1-step synchronization mode for providing time T1 and time T4 to the slave device as the synchronization information. In the embodiment, the limited bit number herein is that the bit number is not enough for representing the entire calendar time. For further explanation, the calendar time TOD that the counting circuit 310 counts and the counting value provided by timestamp circuit 331 are synchronized frequently for keeping the frequency consistency. In the embodiment, the remainder which is computed by the calendar time TOD and the bit number N of the timestamp circuit 331 is equal to the counting value of the timestamp circuit 331. That is, the remainder can deems as the counting value of the timestamp circuit 331 when the processor 320 receives the calendar time TOD.

Figure 3:
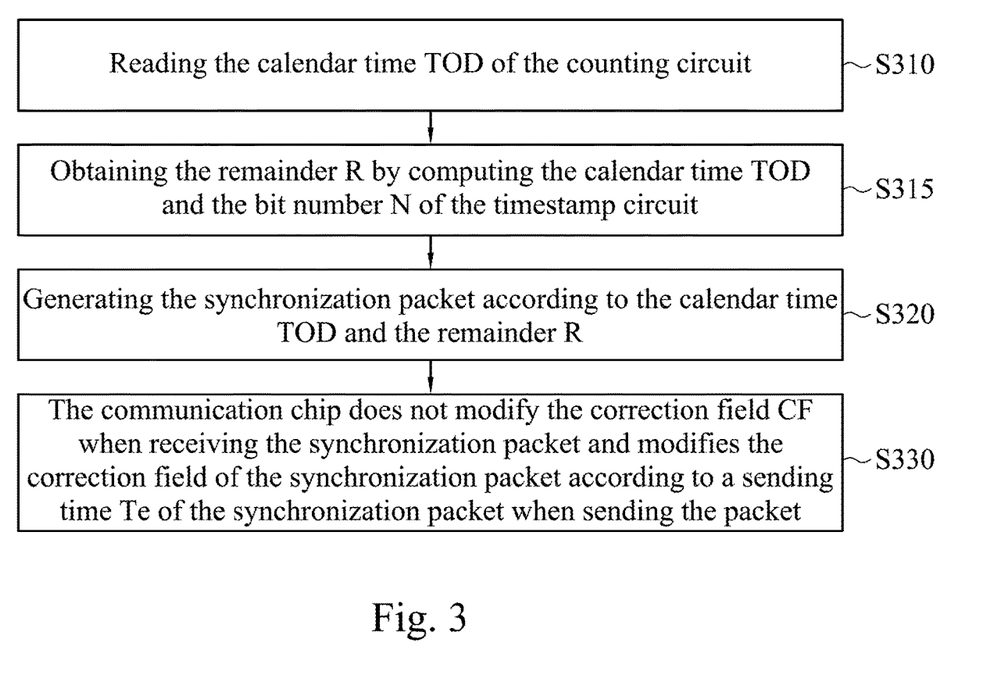
FIG. 3 is a flow chart illustrating that a synchronization packet is generated and sent according to some embodiments of the present disclosure.

Reference is made to FIG. 3. FIG. 3 is a flow chart illustrating that a synchronization packet is generated and sent according to the embodiment of the present disclosure. The following description is made incorporating with FIG. 2 with FIG. 3 for the process that the master device 300 generates and sends the synchronization packet (sync packet). It should be noted that, in the embodiment, the first port 335 of the master device 300 is set as transparent mode and the second port 337 is set as normal mode.

In step S310, the processor 320 reads the calendar time TOD of the counting circuit 310. In the step, the processor 320 reads the counting value of the counting circuit 310 to obtain the calendar time TOD before generating the synchronization packet.

In step S315, the processor 320 obtains the remainder R by computing the calendar time TOD and the bit number N of the timestamp circuit 331.

In the step, according to the bit number N of the timestamp circuit 331, the processor 310 obtains the remainder R by computing the calendar time TOD and the bit number N. For example, the processor 310 executes a MOD function computation on the calendar time TOD and the bit number N to obtain the remainder R. In another embodiment, the processor 310 divides the calendar time TOD by the bit number N to obtain the quotient Q and the remainder R. It should be noted that the remainder R can be obtained if the calendar time TOD satisfies function (1):

$$TOD = Q \times 2^N + R \qquad \text{function (1)}$$

TOD is the calendar time, N is the bit number of the timestamp circuit 331, Q is the quotient, and R is the remainder. In the embodiment, N is 32 bits.

In step S320, the processor 320 generates the synchronization packet according to the calendar time TOD and the remainder R. In the step, the synchronization packet generated by the processor 320 includes the timestamp field (TS) and the correction field (CF), and the processor 320 writes the calendar time TOD into the timestamp field and writes a complement (−R) of the remainder R into the correction field. For the sake of easily understanding, reference is made in TABLE 1 which shows the fields and the corresponding value of the synchronization packet.

TABLE 1

| the fields and corresponding values of the packet | |
|---|---|
| Timestamp TS | Correction field CF |
| $Q \times 2^N + R$ | −R |

In another embodiment, the processor 320 subtracts the remainder R from the calendar time TOD and writes a result into the timestamp field and writes 0 or a null value into the correction field CF. For the sake of ease for understanding, reference is made in TABLE 1-1 which shows the fields and the corresponding values of the synchronization packet.

TABLE 1-1

| the fields and corresponding values of the packet | |
|---|---|
| Timestamp TS | Correction Field CF |
| $Q1 \times 2^N$ | 0 |

In step S330, the communication chip 330 does not modify the correction field CF when receiving the synchronization packet and modifies the correction field of the synchronization packet according to a sending time Te of the synchronization packet when sending the packet. In step S330, the communication chip 330 receives the synchronization packet transmitted by the processor 320 through the second port 337, wherein the second port 337 is set as the normal mode, and does not modify the correction field CF of the synchronization packet. In subsequent, when the communication chip 330 plans to transmit the synchronization packet through the first port 335, and because the first port 335 is set as the transparent mode, the counting value provided by timestamp circuit 331 is obtained as a sending time Te for modifying the correction field, and then the synchronization packet is sent through the first port 335. In the embodiment, before the synchronization packet is sent through the first port 335, the instant counting value of the timestamp circuit 331 is obtained as the sending time Te. The communication chip 330 adds the value of the correction field CF to the sending time Te, and the result is written into the correction field CF, then the synchronization packet is transmitted through the first port 335. The value of the correction field CF is represented as below function (2).

$$CF = -R + Te \qquad \text{function (2)}$$

In another embodiment, the value of the correction field CF is 0 or a null value. The value of the correction field CF is added to the sending time Te and the result is represented as below function (2-1).

$$CF = Te \qquad \text{function (2-1)}$$

By the steps described above, the master device 300 can transmit the synchronization packet to the slave device 400 through the 1-step synchronization mode. Based on the IEEE1588 protocol, the slave device 400 adds the value of the timestamp field to the correction field and the summation is obtained, i.e., time T1. In the embodiment, the time information carried in the synchronization packet received by the slave device 400 is shown in TABLE 2.

TABLE 2

| the fields and corresponding values of the packet | |
|---|---|
| Timestamp TS | Correction Field CF |
| $Q \times 2^N + R$ | $-R + Te$ |

Therefore, the slave device 400 receives, at time T2, the synchronization packet and analyzes the timestamp field TS and the correction field CF carried in the synchronization packet to compute a synchronization packet sending time $T1=Q \times 2^N+R+(-R)+Te$. That is, $T1=Q \times 2^N+Te$.

In another embodiment, the time information carried in the synchronization packet received by the slave device 400 is shown in TABLE 2-1.

TABLE 2-1

| the fields and corresponding values of the packet | |
|---|---|
| Timestamp TS | Correction field CF |
| $Q \times 2^N$ | Te |

Therefore, $T1=Q \times 2^N+Te$. In the two embodiments described above, time T1 is provided as the same value.

Figure 4:
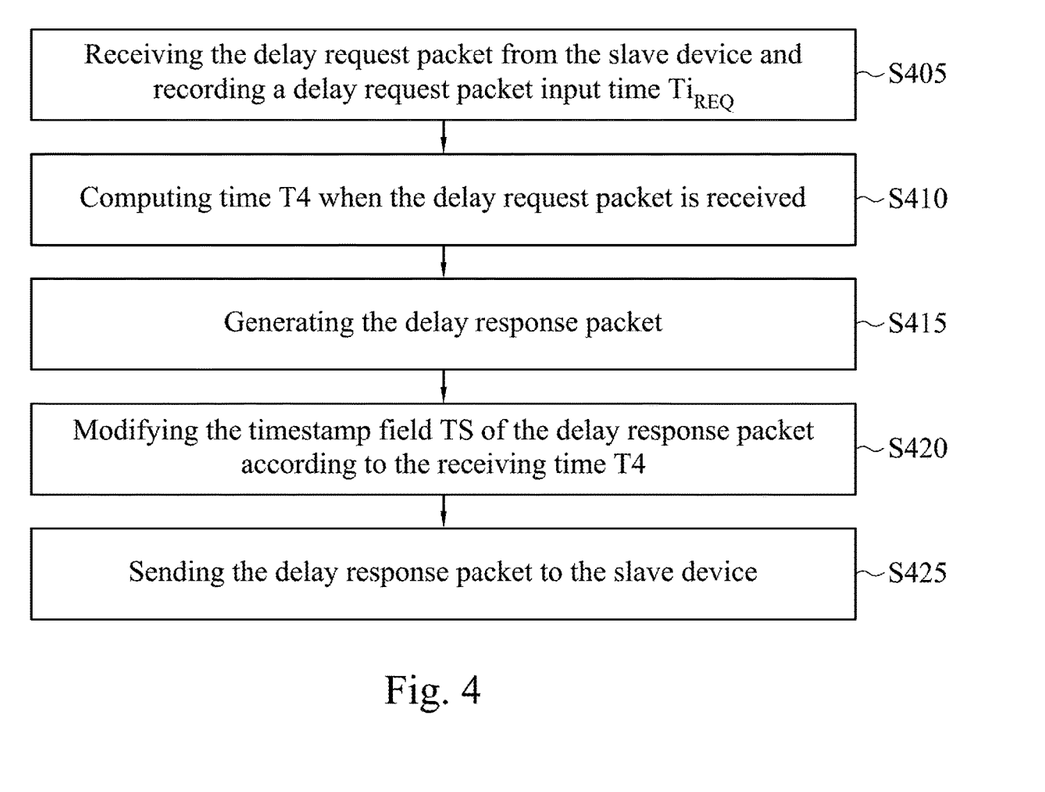
FIG. 4 is a flow chart illustrating that the master device generates and sends the delay request packet according to some embodiments of the present disclosure.

Then by IEEE1588 protocol, the master device 300 receives the delay request packet sent by the slave device 400, and the master device 300 sends the receiving time of when the packet is received to the slave device 400 by the delay response packet. Reference is made to FIG. 4. FIG. 4 is a flow chart illustrating that the master device 300 generates and sends the delay response packet according to some embodiments of the present disclosure. The following description is made incorporated with FIG. 2 and FIG. 4.

In step S405, the communication chip 330 receives the delay request packet from the slave device 400 through the first port 335 and records a delay request packet input time $Ti_{REQ}$. In the step, when the first port 335 receives the delay request packet, the communication chip 330 reads the counting value of the timestamp circuit 331 to obtain the delay request packet input time $Ti_{REQ}$.

In step S410, the processor 320 computes a receiving time T4 of the delay request packet according to the quotient and the remainder obtained from the counting value of the counting circuit 310.

In the step, when the first port 335 receives the delay request packet, the processor 320 reads the counting value of the counting circuit 310 to obtain a delay request packet receiving calendar time $TOD_{REQ}$ and divides the delay request packet receiving calendar time $TOD_{REQ}$ by the bit number N of the timestamp circuit 331 to obtain the quotient $Q_{REQ}$ and the remainder $R_{REQ}$. The processor 320 multiplies the quotient $Q_{REQ}$ by 2 to the power of the bit number N, the result is added to the delay request packet input time $Ti_{REQ}$, and the summation is the receiving time T4. For the sake of ease of understanding, the receiving time T4 can be computed by function (3):

$$T4=Q_{REQ} \times 2^N+Ti_{REQ} \quad \text{function (3)}$$

The processor 320 computes the receiving time T4 by function (3).

In some embodiments, in step S410 a determination of whether the quotient $Q_{REQ}$ should be added to 1 is made. For example, the processor 320 compares the delay request packet input time $Ti_{REQ}$ with the remainder $R_{REQ}$. If the processor 320 determines that the delay request packet input time $Ti_{REQ}$ is equal to or smaller than the remainder $R_{REQ}$, the counter 313 of the counting circuit 310 does not overflow in the duration from the communication chip 330 receiving the delay request packet to the processor 320 receiving the calendar time $TOD_{REQ}$. On the contrary, if the processor 320 determines that the delay request packet input time $Ti_{REQ}$ is larger than the remainder $R_{REQ}$, the counter 313 of the counting circuit 310 overflows once. In this embodiment, the processor 320 adds the quotient $Q_{REQ}$ to 1, and the receiving time T4 can be computed by function (4).

$$T4=(Q_{REQ}+1) \times 2^N+Ti_{REQ} \quad \text{function (4)}$$

In step S415, the processor 320 generates the delay response packet. In some embodiments, the time information carried by the delay response packet includes the timestamp field TS and the correction field CF.

In step S420, the processor 320 modifies the timestamp field TS of the delay response packet according to the receiving time T4.

In some embodiments, the processor 320 writes the time T4 which is computed by function (3) into the timestamp TS of the packet.

In step S425, the communication chip 330 sends the delay response packet to the slave device 400 through the first port 335.

By the steps described above, the slave device 400 receives the delay response packet and analyzes the timestamp field of the delay response packet to obtain the receiving time T4.

The above description is related to how the master device generates and sends the synchronization packet and the delay response packet in the present disclosure.

Figure 5:
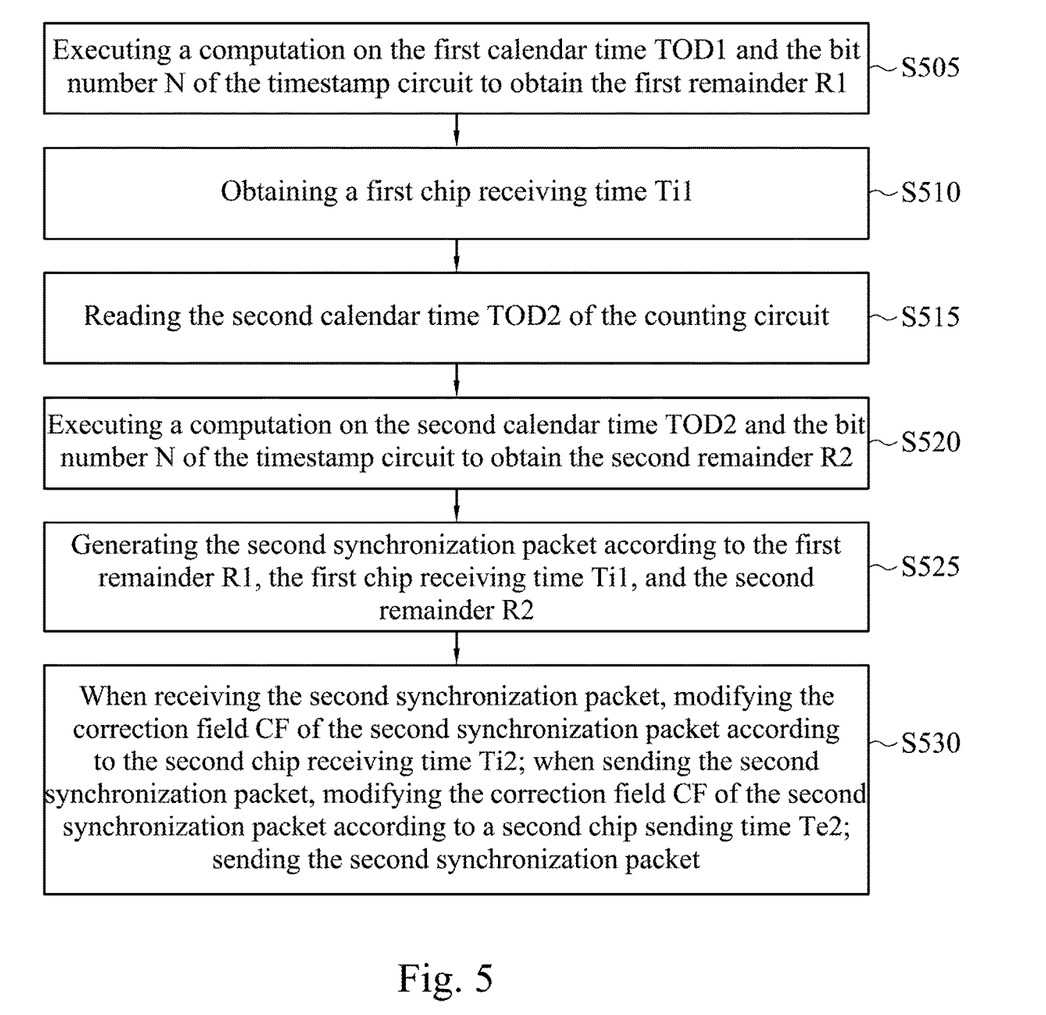
FIG. 5 is a flow chart illustrating that the master device generates and sends a synchronization packet according to some embodiments of the present disclosure.

Reference is made to FIG. 5. FIG. 5 is a flow chart illustrating that the master device generates and sends a synchronization packet according to the second embodiment of the present disclosure. The following description is made incorporated with FIG. 2 and FIG. 5 for illustrating that the master device 300 generates and sends the synchronization packet in the second embodiment.

In the embodiment, both the first port 335 and the second port 337 are set as the transparent mode. It should be noted that the parameters and terms in the embodiments of the disclosure are shown by the first and the second for representing the different periods which the different synchronization packets are generated. For example, the first calendar time TOD1 and the second calendar time TOD2 represent the calendar time which are obtained by the different periods which the different synchronization packets are generated. The first remainder R1 and the second remainder R2 are obtained by the different periods which the different synchronization packets are generated, and the first calendar time TOD1 and the first remainder R1 are obtained by the same period which the packet are generated.

In step S505, the processor 320 executes a computation on the first calendar time TOD1 and the bit number N of the timestamp circuit 331 to obtain the first remainder R1. The step is similar to steps S310 to S315 and not described herein.

In step S510, the processor 320 obtains a first chip receiving time Ti1. In the step the second port 337 is operated in the transparent mode. In the embodiment, when the second port 337 receives the first synchronization packet from the processor 320, the communication chip 330 reads the counting value of the timestamp circuit 331 to obtain the first chip receiving time Ti1. In another embodiment, when the processor 320 sends the first synchronization packet, the first chip receiving time Ti1 is obtained by the counting value of the counting circuit 310.

In step S515, the processor 320 reads the second calendar time TOD2 of the counting circuit 310 when planning to generate the second synchronization packet. The step is similar to step S310 and is not described herein.

In step S520, the processor 320 executes a computation on the second calendar time TOD2 and the bit number N of the timestamp circuit 331 to obtain the second remainder R2. The step is similar to step S315 and is not described herein.

In step S525, the processor 320 generates the second synchronization packet according to the first remainder R1, the first chip receiving time Ti1, and the second remainder R2. In the step, the processor 320 generates the second synchronization packet which has the timestamp field and the correction field. The processor 320 computes a summation of a difference, which is generated by subtracting the first chip receiving time Ti1 from the first remainder R1, and the second remainder R2 and adds the summation to the second calendar time TOD2, which is the computation of function (5):

$$TOD2 = Q2 \times 2^N + R2 + R2 + (Ti1 - R1) \quad \text{function (5)}$$

The value that satisfies function (5) is written into the timestamp field TS. The complement of the second remainder R2, i.e., −R2, is written into the correction field CF, which is shown in TABLE 3.

TABLE 3

| the fields and corresponding values of the packet | |
|---|---|
| Timestamp TS | Correction field CF |
| $Q2 \times 2^N$ + R2 + R2(Ti1 − R1) | −R2 |

Therefore, in the step, the value of the timestamp TS is the value of the second calendar time TOD2 plus the R2+Ti1−R1.

In another embodiment, the processor 320 computes a summation of the difference, which is generated by substracting the first chip receiving time Ti1 from the first remainder R1, and the second calendar time TOD2, which is the computation of function (5-1):

$$TOD2 = Q2 \times 2^N + R2 + (Ti1 - R1) \quad \text{function (5-1)}$$

The value that satisfies function (5-1) is written into the timestamp field TS, and the correction field CF is written into 0 or a null value, which are shown in TABLE 3-1.

TABLE 3-1

| the fields and corresponding values of the packet | |
|---|---|
| Timestamp TS | Correction Field CF |
| $Q2 \times 2^N$ + R2 + (Ti1 − R1) | 0 |

In step S530, when the communication chip 330 receives the second synchronization packet, the communication chip 330 modifies the correction field CF of the second synchronization packet according to the second chip receiving time Ti2. When the communication chip 330 sends the second synchronization packet, the communication chip 330 modifies the correction field CF of the second synchronization packet according to a second chip sending time Te2. Subsequently, the communication chip 330 sends the second synchronization packet. In the step, the communication chip 330 receives, through the second port 337, the second synchronization packet sent by the processor 320. When the second synchronization packet received, in corresponding to the second port 337 which is set as the transparent mode, the communication chip 330 reads the counting value of the timestamp circuit 331 to obtain the second chip receiving time Ti2 and subtracts the second chip receiving time Ti2 from the value of correction field CF. In this time, the values of the second synchronization packet are shown in TABLE 4.

TABLE 4

| the fields and corresponding values of the packet | |
|---|---|
| Timestamp TS | Correction Field CF |
| $Q2 \times 2^N$ + R2 + R2(Ti1 − R1) | −R2 − Ti2 |

In another embodiment, the field values of the second synchronization packet are shown in TABLE 4-1.

TABLE 4-1

| the fields and corresponding values of the packet | |
|---|---|
| Timestamp TS | Correction Field CF |
| $Q2 \times 2^N$ + R2 + (Ti1 − R1) | 0 − Ti2 |

When the communication chip 330 plans to send the second synchronization packet through the first port 335, which the first port 335 is set as the transparent mode. The communication chip 330 reads the timestamp circuit 331 to obtain the second chip sending time Te2, and add the second chip sending time Te2 to the correction field. The value of the correction field CF is shown in TABLE 5. The field values of the second synchronization packet are shown in TABLE 5, and this synchronization packet is sent accordingly.

TABLE 5

| the fields and corresponding values of the packet | |
|---|---|
| Timestamp TS | Correction Field CF |
| $Q2 \times 2^N + R2 + R2 + (Ti1 - R1)$ | $-R2 - Ti2 + Te2$ |

In another embodiment, the field values of the second synchronization packet are shown in TABLE 5-1.

TABLE 5-1

| the fields and corresponding values of the packet | |
|---|---|
| Timestamp TS | Correction Field CF |
| $Q2 \times 2^N + R2 + (Ti1 - R1)$ | $0 - Ti2 + Te2$ |

It should be noted that the timestamp circuit 331 and the counting circuit 310 are synchronized with the counting frequency, such that the counting value are consistent in seconds and the value (Ti1−R1) can be considered to be the duration from the time that the processor 320 receives the calendar time to the time that the communication chip 330 receives the synchronization packet. Generally in each period of generating the synchronization packet, the passing time of receiving the calendar time is the same with the passing time that the communication chip 330 receives the synchronization packet. And as shown above, the remainder is equivalent to the counting value of the timestamp circuit 331 when the processor 320 receives the calendar time TOD. Therefore, the second remainder R2 plus the passing time (Ti1−R1) is equivalent to the chip receiving time Ti2 when the communication chip 330 receives the second synchronization packet, i.e., Ti2=R2+Ti1−R1. Therefore, the field values in TABLE 5 can be represented as the field values in TABLE 6.

TABLE 6

| the fields and corresponding values of the packet | |
|---|---|
| Timestamp TS | Correction Field CF |
| $Q2 \times 2^N + R2 + R2 + (Ti1 - R1)$ | $-R2 - (R2 + Ti1 - R1) + Te2$ |

Through the above steps to send the synchronization packet, the slave device 400 can obtain the transmitting time T1 of the second synchronization packet by computation of adding the timestamp TS to the correction field CF, i.e., T1=Q2×2$^N$+R2+R2+(Ti1−R1)+(−R2−(R2+Ti1−R1)+Te2). The simplified function is shown in function (6).

$$T1 = Q2 \times 2^N + Te2 \qquad \text{function (6)}$$

In another embodiment, the field values in TABLE 5-1 can be also represented as TABLE 6-1.

TABLE 6-1

| the fields and corresponding values of the packet | |
|---|---|
| Timestamp TS | Correction Field CF |
| $Q2 \times 2^N + R2 + (Ti1 - R1)$ | $0 - (R2 + Ti1 - R1) + Te2$ |

T1=Q2×2$^N$+R2+Ti1−R1+0−R2−Ti1+R1+Te2, and the simplified function is shown in function (6-1).

$$T1 = Q2 \times 2^N + Te2 \qquad \text{function(6-1)}$$

Accordingly, as can be seen in both function (6) and function (6-1), no matter the synchronization packet is generated as disclosed in the second embodiment or the synchronization packet is generated as disclosed in the first embodiment, times T1 in both of the synchronization packets, which are obtained from the slave device 400, are the same.

It should be noted that, if the second port 337 is set as the transparent mode and step S525 is not performed (i.e., a time compensation is not added to the timestamp and the corresponding value is not written into the correction field, the slave device computes time T1 based on the second synchronization packet, e.g., T1=Q2×2$^N$+R2−Ti2+Te2, when the communication chip 330 modifies the correction field CF of the second synchronization packet after receiving and transmitting the second synchronization packet, the second synchronization packet cannot provide the correct time information.

Accordingly, even if the bit number of hardware of the network device is limited, for example, the network device does not carry the chip having enough bit number, the entire calendar time can also be computed to decrease the manufacturing cost of the communication chip. Furthermore, the network device of the present disclosure can apply the normal communication chip which caries the transparent mode function such that the network device can send the synchronization packet by the 1-step synchronization mode without being limited by the hardware specification of the communication chip.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A network device adapted for sending a synchronization packet to a slave device, wherein the synchronization packet comprises a timestamp field and a correction field, and the network device comprises:
   a counting circuit configured to provide a calendar time TOD;
   a communication chip comprising a first port, a second port, and a timestamp circuit which has a bit number N; and
   a processor coupled to the first port of the communication chip, wherein the processor is configured to:
      obtain a remainder R according to the calendar time TOD and the bit number N; and
      write the calendar time TOD and the remainder R into the synchronization packet.

2. The network device of claim 1, wherein the processor executes a MOD function computation on the calendar time TOD and the bit number N to obtain the remainder R.

3. The network device of claim 1, wherein the processor executes a division computation on the calendar time TOD and the bit number N to obtain the remainder R and a quotient Q.

4. The network device of claim 1, wherein the first port is set as a normal mode, and the second port is set as a transparent mode; wherein the processor writes the calendar time TOD into the timestamp field and writes a complement (−R) of the remainder (R) into the correction field.

5. The network device of claim 1, wherein the first port is set as a normal mode, and the second port is set as a transparent mode; wherein the processor computes a difference between a first remainder R1 and the calendar time TOD and writes the difference into the timestamp field, and the processor writes 0 or a null value into the correction field.

6. The network device of claim 5, wherein when the communication chip receives a delay request packet, a delay request packet input time $Ti_{REQ}$ is recorded;
    the counting circuit provides a delay request packet receiving calendar time $TOD_{REQ}$; and
    the processor is configured to:
        obtain a corresponding quotient $Q_{REQ}$ and a corresponding remainder $R_{REQ}$ according to the delay request packet receiving calendar time $TOD_{REQ}$ and the bit number N; and
        generate a delay response packet according to the corresponding quotient $Q_{REQ}$, the bit number N, and the delay request packet input time $Ti_{REQ}$.

7. The network device of claim 6, wherein the processor adds the corresponding quotient $Q_{REQ}$ with 1 when the delay request packet input time $Ti_{REQ}$ is larger than the corresponding remainder $R_{REQ}$.

8. A network device adapted for sending a synchronization packet to a slave device, wherein the network device obtains a first calendar time TOD1, a first remainder R1, and a first chip receiving time Ti1 in a first period when a first synchronization packet is generated, and the synchronization packet comprises a timestamp field and a correction field, wherein the network device comprises:
    a counting circuit configured to provide the first calendar time TOD1 in the first period when the first synchronization packet is generated, and provide a second calendar time TOD2 in a second period when a second synchronization packet is generated;
    a communication chip comprising a first port, a second port, and a timestamp circuit which has a bit number N, wherein the first port and the second port are set as a transparent mode, and the first chip receiving time Ti1 is obtained when the first synchronization packet is received and a second chip receiving time Ti2 is obtained when the second synchronization packet is received; and
    a processor coupled to the first port of the communication chip, wherein the processor is configured to:
        write the second calendar time TOD2, the first remainder R1, and the first chip receiving time Ti1 into the second synchronization packet.

9. The network device of claim 8, wherein the processor is further configured to:
    obtain a second remainder R2 according to the second calendar time TOD2 and the bit number N; and
    write the second remainder R2 into the second synchronization packet.

10. The network device of claim 9, wherein the processor executes a MOD function computation on the second calendar time TOD2 and the bit number N to obtain the second remainder R2.

11. The network device of claim 9, wherein the processor executes a division computation on the second calendar time TOD2 and the bit number N to obtain the second remainder R2.

12. The network device of claim 9, wherein the processor computes a summation of the second calendar time TOD2, the second remainder R2, and a difference which subtracts the first remainder R1 from the first chip receiving time Ti1 and writes the summation into the timestamp field of the second synchronization packet, and a complement (−R2) of the second remainder R2 is written into the correction field of the second synchronization packet.

13. The network device of claim 8, wherein the processor computes a summation of the second calendar time TOD2 and a difference value which subtracts the first remainder R1 from the first chip receiving time Ti1 and writes the summation into the timestamp field of the second synchronization packet, and the processor writes 0 or a null value into the correction field.

14. The network device of claim 8, wherein the communication chip records a delay request packet input time $Ti_{REQ}$ when receiving a delay request packet;
    the counting circuit provides a delay request packet receiving calendar time $TOD_{REQ}$; and
    the processor is configured to:
        obtain a corresponding quotient $Q_{REQ}$ and a corresponding remainder $R_{REQ}$ according to the delay request packet receiving calendar time $TOD_{REQ}$ and the bit number N; and
        generate a delay response packet according to the corresponding quotient $Q_{REQ}$, the bit number N, and the delay request packet input time $Ti_{REQ}$.

15. The network device of claim 14, wherein the processor adds 1 to the corresponding quotient $Q_{REQ}$ when the delay request packet input time $Ti_{REQ}$ is larger than the corresponding remainder $R_{REQ}$.

* * * * *